(No Model.)
N. E. SMITH.
COMPOUND METAL WORKING TOOL.
No. 575,381. Patented Jan. 19, 1897.
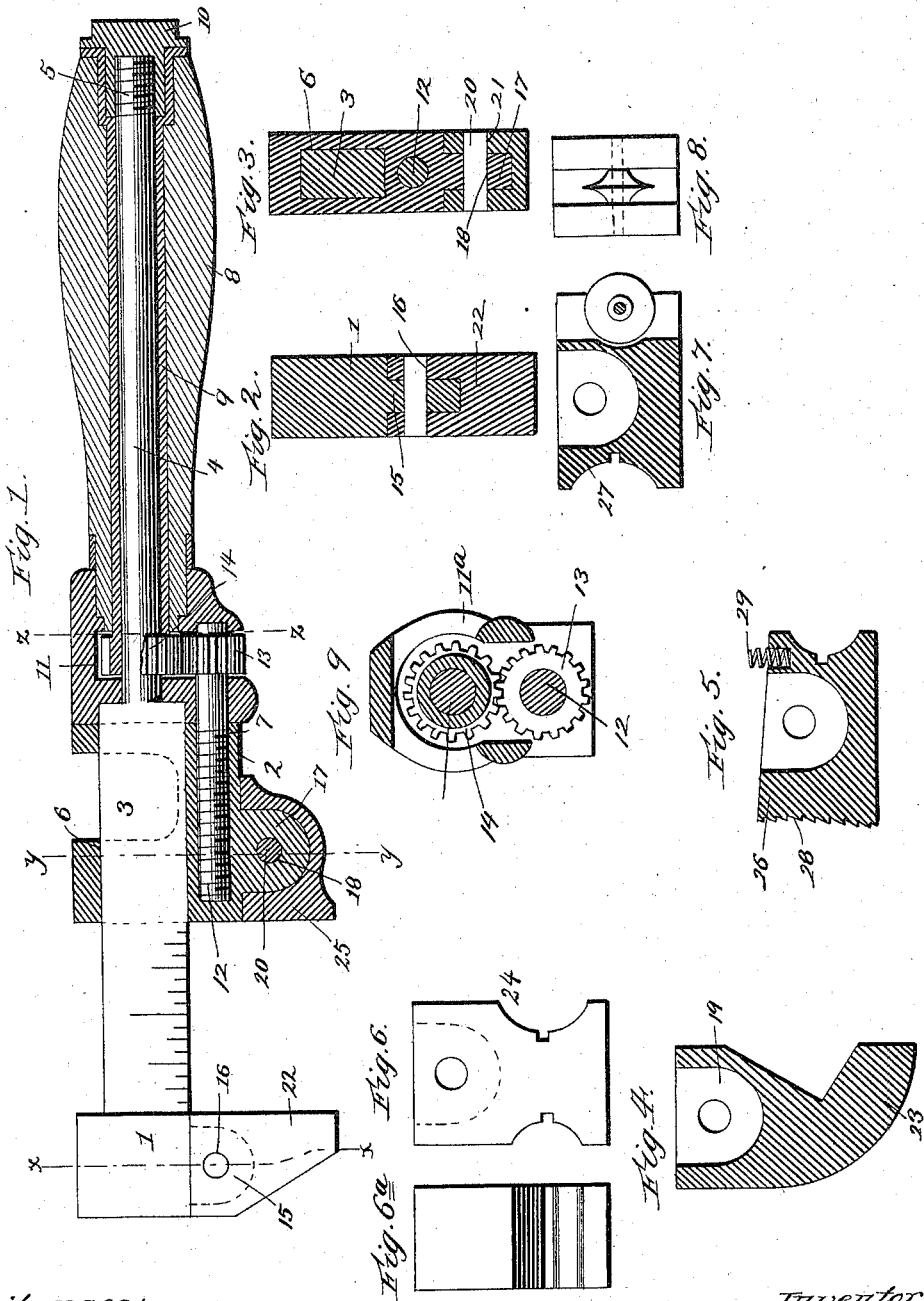
Witnesses:
C. H. Reeder
W. A. James
Inventor
N. E. Smith
By James Sheehy
Attorney

UNITED STATES PATENT OFFICE.

NATHANIEL E. SMITH, OF JERSEY CITY, NEW JERSEY.

COMPOUND METAL-WORKING TOOL.

SPECIFICATION forming part of Letters Patent No. 575,381, dated January 19, 1897.

Application filed August 5, 1896. Serial No. 601,787. (No model.)

*To all whom it may concern:*

Be it known that I, NATHANIEL E. SMITH, a citizen of the United States, residing at Jersey City, in the county of Hudson and State of New Jersey, have invented certain new and useful Improvements in Compound Implements; and I do declare the following to be a full, clear, and exact description of the invention, such as will enable others skilled in the art to which it appertains to make and use the same.

My invention relates to improvements in compound implements; and it contemplates the provision of an implement and removable attachments therefor whereby the implement may be readily converted into a nut-wrench, a pipe-wrench, a pipe-cutter, or a thread-cutter capable of being adjusted to operate upon articles of different sizes.

With the foregoing ends in view the invention will be fully understood from the following description and claims when taken in conjunction with the annexed drawings, in which—

Figure 1 is a longitudinal section of an implement embodying my invention, the same being shown as adapted for use as a nut-wrench. Figs. 2 and 3 are transverse sections taken in the planes indicated by the lines $xx$ and $yy$, respectively, of Fig. 1. Fig. 4 is a sectional view of an attachment designed for use when the implement is to be used as a pipe-wrench and also when it is to be used as a pipe-cutter. Fig. 5 is a sectional view of an attachment designed for use in conjunction with the attachment shown in Fig. 4 when the implement is to be used as a pipe-wrench and also designed for use in conjunction with the attachment shown in Fig. 6 when the implement is to be used as a pipe-threader. Figs. 6 and 6ª show an attachment capable of cutting threads upon pipes of different diameters. Fig. 7 is a sectional view of an attachment designed for use in conjunction with that shown in Fig. 6 to form a pipe-threader and also designed for use in conjunction with the attachment shown in Fig. 4 to form a pipe-cutter. Fig. 8 is an end view of the same, and Fig. 9 is a section on line $zz$ of Fig. 1.

In the said drawings similar numerals designate corresponding parts in all of the views, referring to which—

1 indicates the stationary head, and 2 the adjustable or movable head, of my improved implement. The stationary head 1 is provided with an angular shank 3 and terminates in a cylindrical stem 4, which is provided at its free end with screw-threads 5. The adjustable head 2 is slidable upon the angular shank 3 and has a longitudinal angular aperture 6 to receive said shank, and also has the longitudinally-disposed screw-tapped aperture 7, below the aperture 6, for a purpose presently described.

8 indicates a handle, which is preferably of wood, although it may be of other suitable material, and within this handle is fixed a hollow shaft or tube 9, which receives the cylindrical stem 4, and is held therein by means of a screw-cap 10, which engages the threaded portion 5 of said stem.

11 indicates a socket or hollow head. This socket is arranged partly upon the inner end of the cylindrical shank 4 and partly upon the inner end of the angular shank 3, and it loosely receives the inner end of the handle 8, as shown, and is provided upon opposite sides of the wrench (see Fig. 9) with guards 11, designed and adapted to prevent the hand of the operator from being caught in the gearing presently described.

12 indicates a longitudinally-disposed threaded rod. This rod is arranged in the screw-tapped aperture 7 of the slidable head 2, and its opposite end passes into the socket 11 and has fixed to it a toothed wheel or pinion 13, which engages a toothed wheel or pinion 14, also within the socket and fixed to the inner end of the tubular shaft 9. In virtue of this construction it will be seen that by simply turning the handle 8, and consequently the tubular shaft 9, in one direction the slidable head 2 will, through the medium of the pinions or toothed wheels 13 14 and the threaded rod 12, be moved forwardly upon the angular shank 3, and by turning the handle in the opposite direction the movement of the slidable head 2 will be reversed.

The construction thus far described, with the exception of the fixed head 1, the slidable head 2, and the guards 11ª, is similar to and operates in the same manner as the construction embodied in the wrench forming the subject-matter of my Letters Patent dated February 6, 1894, and numbered 514,166.

The fixed head 1 is provided upon one side with a lug 15, which is disposed longitudinally of the implement and is provided with a transverse aperture 16, and the slidable head 2 is provided upon its corresponding side with a similar lug 17, having a transverse aperture 18. These lugs 15 17 are designed and adapted to take into sockets 19 in the attachments shown, and the said attachments are designed to be removably secured upon the lugs by the transverse pins 20, which take through apertures 21 in the side walls of the sockets 19 and through the transverse apertures of the lugs, as shown. When any two of the attachments are secured upon the lugs 15 17, as shown in Fig. 1 of the drawings, it will be observed that the lugs will fully occupy the sockets 19 of the attachments, so as to recompense for and take the place of the metal displaced in forming such sockets, and it will also be observed that the attachments will bear flat upon the head 1 and head 2 upon opposite sides of and at opposite ends of the lugs 15 17, and therefore all strain, both lateral and longitudinal, will be taken off the pins 18 and to a great extent off the lugs 15 17 and placed upon the heads 1 and 2, which are best able to withstand the same.

The attachment 22, (shown in Figs. 1 and 2,) the attachment 23, (shown in Fig. 4,) and the attachment 24 are designed to be connected to the lug 15 of the head 1, the first-named attachment being used when a nut-wrench is desired, the second when a pipe-wrench or a pipe-cutter is desired, and the third when a pipe-threading implement is desired. The attachments 22 and 23 are preferably shaped as shown, as is also the attachment 24, which is provided in its opposite sides with thread-cutters of different sizes to suit pipes of different diameters.

The attachment 25, (shown in Figs. 1 and 3,) the attachment 26, (shown in Fig. 5,) and the attachment 27 (shown in Figs. 7 and 8) are designed to be connected to the lug 17 of the slidable head 2, the first-named attachment being used in conjunction with attachment 22 when a nut-wrench is desired, the second being used in conjunction with the attachment 23 when a pipe-wrench is desired and in conjunction with attachment 24 when a thread-cutter is desired, and the third being used in conjunction with the attachment 23 when a pipe-cutter is desired and in conjunction with the attachment 24 when a thread-cutter is desired.

The attachment 26 (shown in Fig. 5) has its face 28 dentated, as shown, and in order to enable said dentated face to better grip a pipe it is also provided with a spring 29, which in operation is interposed between the attachment and the head 2.

The attachment 27 is provided at one end with a thread-cutter and at its opposite end with a pipe-cutter, as shown.

From the foregoing it will be seen that I have provided an implement which, with its several attachments, is very simple and cheap and which may be quickly and easily adapted for use as a nut-wrench, pipe-wrench, pipe-cutter, or thread-cutter, and which is capable of being quickly and easily adjusted to suit articles of various sizes. It will also be seen that all of the attachments are applied upon the same side of the wrench, and it is therefore no more cumbersome and unwieldy than the ordinary wrench.

While I have shown and described my improvements as applied to an implement embodying the construction disclosed in my aforesaid Letters Patent, it is obvious that they may be applied or embodied in any implement having a fixed head and a slidable head adapted to be adjusted and adjustably fixed with respect to the fixed head. It is also obvious that a construction other than that shown and described may be employed for detachably connecting the several attachments with the heads 1 and 2, although I prefer to employ the construction disclosed for the reasons stated.

Having described my invention, what I claim is—

1. A compound implement having fixed and adjustable heads, a reversible attachment arranged on one side of the fixed head and having different-sized thread-cutters in its opposite sides, and means for detachably connecting the reversible attachment and the fixed head; the said reversible attachment being designed to be used in conjunction with an attachment adapted to be arranged on one side after the adjustable head and having one of its ends provided with a thread-cutter corresponding in size to the larger of the thread-cutters of the attachment on the fixed head, and being also designed to be used in conjunction with another attachment adapted to be used on the adjustable head interchangeably with the other attachment and having one of its ends provided with a thread-cutter corresponding in size to the smaller of the thread-cutters of the reversible attachment on the fixed head, substantially as specified.

2. A compound implement having fixed and adjustable heads provided with flat sides and lugs extending from said flat sides and having apertures, removable attachments arranged on the said heads and having flat sides engaging and bearing, throughout their length and width, flat against the flat sides of the heads and also having sockets corresponding in size to and snugly receiving the lugs of said heads and apertures formed in the walls of the sockets in alinement with the apertures of the lugs, and removable pins extending through the apertures of the attachments and the apertures of the lugs, substantially as specified.

3. The improved compound implement comprising the fixed head having the angular shank 3, and integral cylindrical shank 4, having its outer end threaded and slidably arranged upon the angular shank 3, and the screw-tapped aperture 7, the revoluble handle arranged upon the cylindrical shank 4, the nut 10, for securing the same on the shank, the socket 11, having the side guards $11^a$, the pinion on the toothed wheel 14, within the socket and on the inner end of said handle, the threaded rod 12, arranged within the screw-tapped aperture of the slidable head, the pinion or toothed wheel secured to one end of said rod within the socket and in engagement with the pinion on the handle, and attachments detachably connected to the fixed and adjustable heads, substantially as and for the purpose set forth.

In testimony whereof I affix my signature in presence of two witnesses.

NATHANIEL E. SMITH.

Witnesses:
ARTHUR A. SMITH,
ALIDA LAPPIN.